United States Patent
Kawashima

(10) Patent No.: US 8,263,157 B2
(45) Date of Patent: Sep. 11, 2012

(54) PELLETIZATION METHOD FOR RAW ROYAL JELLY

(75) Inventor: Nisaburo Kawashima, Tokyo (JP)

(73) Assignee: M. Foods Corporation, Tokyo (JP)

(*) Notice: Subject to any disclaimer, the term of this patent is extended or adjusted under 35 U.S.C. 154(b) by 113 days.

(21) Appl. No.: 12/011,723

(22) Filed: Jan. 29, 2008

(65) Prior Publication Data

US 2008/0187639 A1    Aug. 7, 2008

(30) Foreign Application Priority Data

Feb. 2, 2007    (JP) .................... 2007-24014

(51) Int. Cl.
- A23G 3/02 (2006.01)
- A23L 1/10 (2006.01)
- A23C 9/00 (2006.01)
- A61K 35/64 (2006.01)

(52) U.S. Cl. .................... 426/512; 426/454; 424/539

(58) Field of Classification Search .................... 426/512
See application file for complete search history.

(56) References Cited

U.S. PATENT DOCUMENTS

| | | | |
|---|---|---|---|
| 2003/0059479 A1* | 3/2003 | Miyake | 424/539 |
| 2005/0048128 A1* | 3/2005 | Miyata et al. | 424/539 |

FOREIGN PATENT DOCUMENTS

| | | | |
|---|---|---|---|
| JP | SHO-52-90670 | | 7/1977 |
| JP | 03123452 A | * | 5/1991 |
| JP | HEI5-103604 | | 4/1993 |
| JP | 2002176936 A | * | 6/2002 |

OTHER PUBLICATIONS

Asahi Kasei Chemicals, "Pregelatinized starch PCS", internet article, Oct. 2004, retrieved from the Internet: URL: http://web.archive.org/web/20041014112730/http://www.ceolus.com/eng/products/pcs/index.html, retrieved Oct. 15, 2009.*

Asahi Kasei Chemicals, "Pregelatinized starch PCS", internet article, Oct. 2004, retrieved from the Internet:URL: http://web.archive.org/web/20041014112730/http://www.ceolus.com/eng/products/pcs/index.html.*

Derwent Abstract and Machine Translation of CN 1772113.*

Stuff-Japan, "DHC Royal Jelly," Oct. 2007, retrieved from the Internet: http://stuff-japan.com/product_info.php?manufacturers_id=12&products_id=137&osCsid=2f9c8cc734a389b58c62bfebaef0cb4f.*

(Continued)

*Primary Examiner* — Humera Sheikh
*Assistant Examiner* — Tynesha McClain-Coleman
(74) *Attorney, Agent, or Firm* — Scott D. Wofsy; Edwards Wildman Palmer LLP

(57) ABSTRACT

An objective of the present invention is to enable 100% assimilation of all the nutritional components of raw royal jelly, by manufacturing pelletized royal jelly of a predetermined granule size distribution that is easy to ingest, which can be preserved at room temperature and pressure. The pelletization method for raw royal jelly in accordance with the present invention comprises the steps of preparing raw royal jelly; mixing the raw royal jelly with a predetermined partially pregelatinized starch at a predetermined mixture ratio, at room temperature and pressure but without heating; pelletizing the resultant product at room temperature and pressure but without heating; and dehydrating the resultant product at room temperature and pressure to a predetermined moisture, in order to create pelletized royal jelly having a predetermined granule size distribution.

8 Claims, 1 Drawing Sheet

OTHER PUBLICATIONS

Oasis Stad, "DHC Royal Jelly Supplement," (no month or date), retrieved from the Internet: http://www.oasis-stad.com/product.php?id_product=358.*

Ceolus, "Pregelatinized Starch PCS," Oct. 2004, retrieved from the Internet: http://web.archive.org/web/20041014112730/http://www.ceolus.com/eng/product/pcs/index.html.*

Asahi Kasei, "PCS," Aug. 2006, retrieved from the Internet: http://web.archive.org/web/20060827182141/http://www.ak-america.com/ak_america.php.*

Machine Translation of Abe JP 2002176936.*

Asahi Kasei America, Inc., Product Sheet, 2 pages, printed Apr. 5, 2011, from http://www.ak-america.com/ak_america.php.

* cited by examiner

PELLETIZATION METHOD FOR RAW ROYAL JELLY

BACKGROUND OF THE INVENTION

The present invention relates to a pelletization method for raw royal jelly.

Raw royal jelly is produced by honey bees in a similar manner to honey, but the composition thereof is fundamentally different. This raw royal jelly is the foodstuff for queen bees that young worker bees have synthesized and manufactured within their bodies, using honey and flower pollen as raw materials. More specifically, 1) worker bees collect flower pollen, 2) they knead this pollen together with honey from the flowers into a "dumpling" form that they carry back to the nest, 3) these "dumplings" are fed to young bees for up to ten days after birth, then 4) after passing through the digestive systems of these bees, the raw royal jelly is reconstituted by the salivary glands and is secreted as an "astringent-tasting milky-white liquid" from endocrine glands in the heads of the bees.

Raw royal jelly contains a moderate amount of the three main nutritional components (proteins, sugars, and fats); is rich in vitamins, minerals, and amino acids; and furthermore contains over forty different nutritional components such as a wide range of enzymes; where these nutritional components are in a good balance. In addition, raw royal jelly has an unknown substance among its nutritional components, which is called the "R substance" from the initial letter of royal jelly.

There is actual proof of the effects on diseases obtained by assimilating raw royal jelly, such as preventing aging by activating the autonomic nerves, treating autonomic ataxia, expected prevention of diabetes, mitigation of the symptoms of chronic hepatitis, and preventing cancer.

Products such as raw royal jelly and royal jelly products have been attracting attention as medical supplies and health foods having the above-described effects, and they have currently become standard health foods with consumptions that increase each year.

The royal jelly products on the market are used in fields such as medical supplies and health foods. In addition to the raw products, they are presented in various other forms, such as in capsules, as dehydrated powders, or as granules.

Since raw royal jelly is a natural product and the effective components thereof are included without any transformation, the optimal state is one in all of its nutritional components can be assimilated 100% unchanged. However, such preservation is disadvantageous in that is inconvenient and the products are difficult to ingest. Raw royal jelly must be stored in a refrigerator for short-term preservation or in a freezer for long-term preservation, which makes it difficult to transport while traveling, which is extremely inconvenient. In addition, raw royal jelly has an astringent taste in the mouth when taken, and there is a tingling sensation as it passes through the throat. It has a characteristic taste and smell which gives many people an uncomfortable feeling, so it can not be said to be suitable for everyday use.

Powdered royal jelly and also royal jelly in granule and tablet forms, which can be stored easily, are on the market, but each of these commercial products has been subjected to a freeze-drying process. Since this means that the products have been heated for a fixed time to a temperature on the order of 40° C. to 60° C. during the freeze-drying process, the above-described effects engendered in the nutritional components such as the above-described known substances and the R substance are greatly damaged. This is because the proteins within the raw royal jelly are susceptible to heat and are transformed thereby.

A method of manufacturing powdered raw royal jelly that has been disclosed involves adjusting the pH of a suspension of the raw royal jelly; separating the supernatant liquid and insoluble components, after maintaining the suspension at conditions above room temperature and pressure; subjecting the thus-separated insoluble components to heating in an alkaline aqueous solution, then mixing with the above-described supernatant liquid to obtain a clear royal jelly solution; adjusting the pH of that clear royal jelly solution to be neutral; mixed with a diluting agent; then obtaining the powdered royal jelly by spray-dehydrating or freeze-drying. In this case, any of the alpha starches, soluble starches, dextrins, cyclodextrins, lactose, sucrose, guar gum, or alginic acid can be used as the diluting agent.

With this method, the raw royal jelly is subjected to acidity processing, heating at a temperature and pressure above room temperature and pressure, alkalinity processing, and heating during the spray-dehydration or freeze-drying, so it is inevitable and even natural that the various nutritional components of the raw royal jelly undergo some form of transformation. Since there's an unknown effective substance called the R substance in raw royal jelly, as described above, it is not possible to conclude that this substance will be transformed by that processing, even though analysis of the known substances in raw royal jelly before and after heating has not shown any change in the effective component weights thereof due to the heating process. (Refer to Japanese Patent Laid-Open Publication No. HEI5-103604.)

Since raw royal jelly usually has a moisture content on the order of 60 to 65% by weight, which encourages the growth of mold, it is necessary to preserve it in a freezer or refrigerator. Even if the moisture content of the raw royal jelly is reduced to about 30% by weight, mold starts to grow thereon after about seven days. To solve this problem, when raw royal jelly is pelletized by using a substance such as an pregelatinized starch, which is generally used as a diluting agent, the present developers have determined it is impossible to use a dehydration method at room temperature and pressure but without heating to dehydrate the mixture to a moisture content at which mold does not occur, because the speed at which the dehydration occurs is slow.

The present invention was devised in order to solve these problems of the necessity of freezer or refrigerator storage that is a disadvantage in ensuring that all of the nutritional components of the raw royal jelly are 100% assimilable, together with the resultant difficulty of ingestion, with the objective of providing a method of creating an easy-to-ingest pelletized royal jelly that can be stored at room temperature, where the method involves mixing the raw royal jelly with a powdered foodstuff but not subjecting the resultant mixture to any processing that could transform the nutritional components of the raw royal jelly, such as acidity processing, alkalinity processing, or any heating at above room temperature and pressure.

SUMMARY OF THE INVENTION

The present inventors have discovered a pelletization method for raw royal jelly that comprises the steps of:
preparing raw royal jelly;
mixing said raw royal jelly at room temperature and pressure but without heating with a partially pregelatinized starch that remains in the form of starch particles and also has a degree of water retention of 3 to 6 ml/g, at a mixing ratio of said raw royal jelly with respect to said partially pregelatinized starch of 0.1 to 4.0, in order to create a royal jelly mixture as an absolute dehydrated weight ratio;

pelletizating said royal jelly mixture at room temperature and pressure but without heating, in order to create an intermediate pelletized royal jelly product from said royal jelly mixture; and dehydrating said pelletized royal jelly intermediate product at room temperature and pressure, but without heating, to a moisture content of 3 to 15% by weight, in order to create a pelletized royal jelly product having a predetermined granule size distribution that is easy to ingest;

thereby obtaining a pelletized royal jelly product (hereinafter called: pelletized royal jelly) having a predetermined moisture and granule size distribution that makes it easy to ingest, in which all of the nutritional components of the raw royal jelly can be 100% assimilated and which can be stored at room temperature.

Since the pelletized royal jelly obtained by the pelletization method of the present invention is subjected to absolutely no processing that could transform any of effective components comprised within the raw royal jelly, all of the nutritional components of the raw royal jelly are 100% assimilable, the product can be stored for long periods of time at room temperature and pressure, and also the product is easy to ingest, with none of the characteristic odor or taste of raw royal jelly.

Since the pelletized royal jelly that is obtained by the pelletization method of the present invention does not require storage in a refrigerator or freezer, it can be transported at room temperature while traveling and is extremely convenient.

PREFERRED EMBODIMENTS OF THE PRESENT INVENTION

The present invention relates to a pelletization method for raw royal jelly; wherein the method comprises the steps of:

preparing raw royal jelly;

mixing said raw royal jelly at room temperature and pressure but without heating with a partially pregelatinized starch that remains in the form of starch particles and also has a degree of water retention of 3 to 6 ml/g, at a mixing ratio of said raw royal jelly with respect to said partially pregelatinized starch of 0.1 to 4.0, in order to create a royal jelly mixture as an absolute dehydrated weight ratio;

pelletizating said royal jelly mixture at room temperature and pressure but without heating, in order to create an intermediate pelletized royal jelly product from said royal jelly mixture; and dehydrating said pelletized royal jelly intermediate product at room temperature and pressure, but without heating, to a moisture content of 3 to 15% by weight, in order to create a pelletized royal jelly product having a predetermined granule size distribution that is easy to ingest;

thereby obtaining a pelletized royal jelly having a predetermined moisture and granule size distribution, in which all of the nutritional components of the raw royal jelly are 100% assimilable and which can be stored at room temperature.

The present invention also relates to another pelletization method for raw royal jelly; wherein the method comprises the steps of:

preparing raw royal jelly;

mixing and pelletization involving mixing said raw royal jelly at room temperature and pressure but without heating with a partially pregelatinized starch that remains in the form of starch particles and also has a degree of water retention of 3 to 6 ml/g, at a mixing ratio of said raw royal jelly with respect to said partially pregelatinized starch of 0.1 to 4.0, in order to create a royal jelly mixture as an absolute dehydrated weight ratio, and simultaneously pelletizating said royal jelly mixture at room temperature and pressure but without heating, in order to create an intermediate pelletized royal jelly product from said royal jelly mixture; and dehydrating said pelletized royal jelly intermediate product at room temperature and pressure, but without heating, to a moisture content of 3 to 15% by weight, in order to create a pelletized royal jelly product having a predetermined granule size distribution that is easy to ingest;

thereby obtaining a pelletized royal jelly having a predetermined moisture and granule size distribution, in which all of the nutritional components of the raw royal jelly are 100% assimilable and which can be stored at room temperature.

This pelletization method for raw royal jelly in accordance with the present invention is described below with reference to FIGS. 1 and 2.

Figure 1:
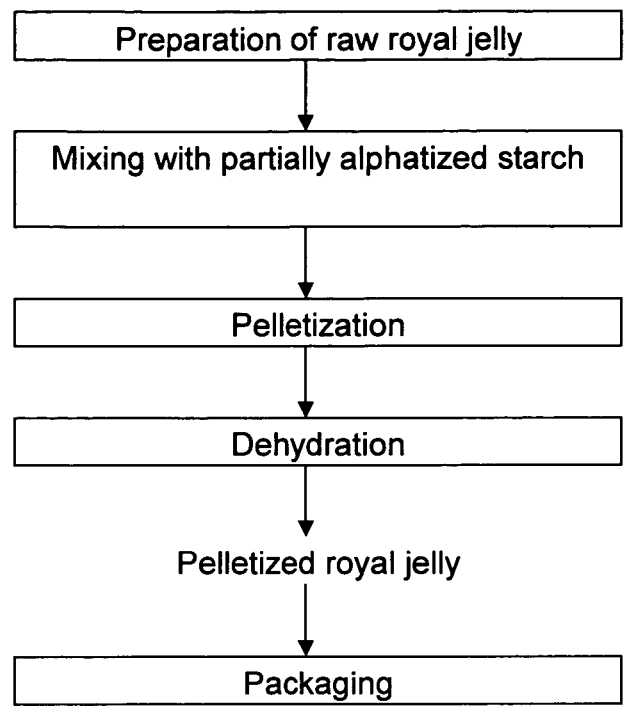
FIG. 1 shows an embodiment of a pelletization method in accordance with the present invention.

FIG. 1 illustrates a method of creating and packaging pelletized royal jelly, where the method comprises: a step of preparing raw royal jelly, a step of mixing the thus-prepared raw royal jelly with partially pregelatinized starch, a subsequent step of pelletization, followed by a step of dehydration.

Figure 2:
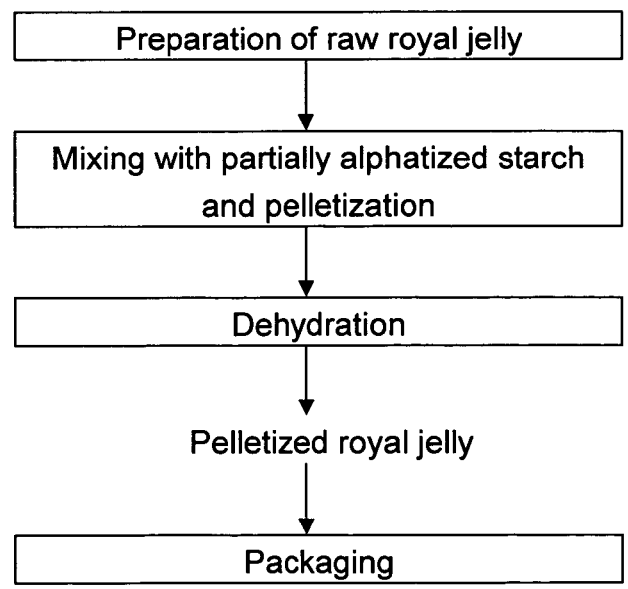
FIG. 2 shows another embodiment of the pelletization method for raw royal jelly in accordance with the present invention.

FIG. 2 illustrates another method of creating and packaging pelletized royal jelly, where the method comprises: a step of preparing raw royal jelly, a step of mixing the thus-prepared raw royal jelly with partially pregelatinized starch and simultaneously pelletizing the same, followed by a step of dehydration.

The raw royal jelly that is the raw material for the pelletization method of the present invention is a milky-white sticky substance similar to fresh cream and having a solid portion (hereinafter called as "the absolute dehydrated weight") on the order of 35 to 40% by weight and a moisture content on the order of 65 to 60% by weight. A standard commercial product with no particular limitations can be used therefor, such a raw royal jelly produced in China.

The partially pregelatinized starch that remains in the form of starch particles, retains the shell structure of starch grains but has an extremely low water-soluble content, and also has a degree of water retention of 3 of 6 ml/g which is used in the present invention is a processed starch obtained by subjecting a raw cereal starch to physical processing, such as heating, and is a water-absorbing and expanding type of processed starch for foodstuffs that has a high water retention capability.

The use of a partially pregelatinized starch that remains in the form of starch particles in the present invention ensures that the mixture of royal jelly and partially pregelatinized starch remains in a powder state during the mixing step and pelletization step or the mixing and pelletization step, enabling efficient execution of those steps.

The partially pregelatinized starch that remains in the form of these starch particles in accordance with the present invention has a degree of water retention of 3 to 6 ml/g. This degree of water retention is preferably high from the point of view of water absorbency, but it will be difficult to remain in the form of starch particles if it is over 6 ml/g as the result of physical processing such as strong heating. From consideration of the purity of the raw royal jelly comprised within the pelletized royal jelly obtained by the pelletization method of the present invention, a degree of water retention of at least 3 ml/g is necessary. If the degree of water retention is less than 3 ml/g, the amount of partially pregelatinized starch required for absorbing water will be excessive. The degree of water retention is preferably 4 to 5 ml/g.

The cereal used as the raw material is not particularly limited and could be wheat, potatoes, rice, sweet potatoes, tapioca, corn, or the like. The partially pregelatinized starch that remains in the form of starch particles and also has a degree of water retention of 3 to 6 ml/g and which is used in the present invention has an extremely low perishability and is tasteless and Odorless, and also does not color the product. Examples of commercial products that can be used as the partially pregelatinized starch that remains in the form of starch particles and also has a degree of water retention of 3 to 6 ml/g in accordance with the present invention include PCS (Registered Trademark) produced by Asahi Kasei Chemicals and *Matsunorin* 340 and *Pinesoft* Sproduced by Matsutani Chemical Industry Co. Ltd. This PCS (Registered Trademark) improves the texture of Japanese and Western confectionery, *Matsunorin* 340 improves cooking characteristics (it prevents the detachment of batter from tempura or other deep-fried battered foods), and *Pinesoft* S is used as a taste enhancer for softening foodstuffs such as breads, cakes, rice cakes, Japanese confectionery, noodles, and fishpaste products.

The mixture ratio in accordance with the present invention of the partially pregelatinized starch that remains in the form of starch particles and also has a degree of water retention of 3 to 6 ml/g and the raw royal jelly must be a mixture ratio of 0.1 to 4.0, as the absolute dehydrated weight ratio of the raw royal jelly to the partially pregelatinized starch that remains in the form of starch particles and also has a degree of water retention of 3 to 6 ml/g. A mixture ratio of below 0.1 will cause a problem concerning the low purity of the raw royal jelly comprised within the pelletized royal jelly obtained by the pelletization method of the present invention. A mixture ratio of greater than 4.0 will cause problems in that the pregelatinized starch in the mixture of the raw royal jelly and the partially pregelatinized starch will not be able to absorb water sufficiently in the mixing step and pelletization step or the mixing and pelletization step, making it impossible to maintain the powder state and thus making it impossible to pelletize the royal jelly even during those steps. This mixture ratio is preferably 0.2 to 0.9.

In general, corn starch or tapioca starch are used as the diluting agent, but such starches do not achieve the objective for the pelletization method of the present invention in that they have extremely low degrees of water retention. Wheat and rice flours are also unsuitable in that they have extremely low degrees of water retention. As the diluting agent, any of the alpha starches, soluble starches, dextrins, cyclodextrins, lactose, sucrose, guar gum, or alginic acid can be used, except that any substance that does not remain in a form resembling starch particles would not be suitable for this use.

In the pelletization method for raw royal jelly in accordance with the present invention, first of all, raw royal jelly and a partially alphatized starch that remains in the form of starch particles and also has a degree of water retention of 3 to 6 ml/g are each measured out in the above-described mixture ratio of the present invention and placed in a mixer, then are mixed at room temperature and pressure without heating. The sequence in which these substances are added to the mixer is not particularly limited, but it is preferable to add the raw royal jelly first and then the partially alphatized starch, from the viewpoint of mixing efficiency.

The mixer used in the mixing step of the present invention is not particularly limited, and thus could be any standard model that can be used for mixing a sticky substance and a powder.

The pelletization step in accordance with the present invention is performed at room temperature and pressure without heating, to pelletize a mixture of raw royal jelly and partially alphatized starch that remains in the form of starch particles and also has a degree of water retention of 3 to 6 ml/g, in the mixture ratio in accordance with the present invention, to produce a predetermined granule size distribution that is easy to ingest.

The granulator used in the pelletization step of the present invention is not particularly limited, provided it can form pellets from a mixture with a comparatively high moisture content.

If a device such as a one-shaft or two-shaft mixing granulator or agitation granulator is used for the pelletization method for raw royal jelly in accordance with the present invention, the mixing step and the pelletization steps can be done simultaneously as a mixing and pelletization step.

The dehydration step in accordance with the present invention is performed at room temperature and pressure without heating, to adjust the moisture content of the pelletized royal jelly product to 3 to 15%. Air blowing or air drying could be used therefor.

As an option, the pellets could be sieved to select suitable pellet sizes, immediately after the pelletization step or the dehydration step.

Similarly, a dehydration step at room temperature and pressure without heating could be added as an option before the above-described mixing step or mixing and pelletization step.

Since the pelletized royal jelly obtained by the pelletization method of the present invention has a predetermined granule size distribution, it is easy to ingest and it is also easy to handle in situations such as during packaging.

Raw royal jelly comprises on the order of 60% by weight of moisture and cannot be preserved at room temperature, but since the water in the royal jelly pellets formed by the pelletization method of the present invention is inactivated by the partially alphatized starch, this pelletized royal jelly can be stored for long periods at room temperature even though it comprises 3 to 15% by weight of moisture.

The pelletized royal jelly obtained by using the pelletization method of the present invention includes only foodstuffs and is safe to ingest as is. It is a tasteless, odorless, colorless milky-white liquid that has an extremely low perishability. It stores well, is not sticky, and is easy to handle.

The pelletization method of the present invention can also be applied to the fabrication of tablets or the like from a combination of the thus-obtained pelletized royal jelly and another substance such as a diluting agent.

Measurement of Degree of Water Retention of the Present Invention

The degree of water retention was measured as described below.

5 g (absolute dehydrated weight) of starch was added to a beaker containing 75 ml of distilled water (at 25° C.) while being stirred at 500 rpm by a magnetic agitator, to disperse it uniformly within the water. The entire contents of the beaker were then transferred to a stoppered test tube having a marking at 100 ml, and were made up to exactly 100 ml with distilled water. After the contents of the test tube had been distributed uniformly, the thus-obtained dispersion was transferred to a centrifugal settler and were subjected to centrifugal separation for ten minutes at 2000 G. The supernatant liquid was discarded, the weight W(g) of the moist deposit was measured, then the absolute dehydrated weight Wo(g) of that deposit was measured, to obtain the degree of water retention as follows:

Degree of water retention=$W/Wo$

Experimental Example 1

We measured out 100 g of commercial raw royal jelly from the Qinghai Plateau of Tibet (moisture content: 60% by weight; absolute dehydrated weight: 40 g. We also measured out 100 g (absolute dehydrated weight: 94.8 g) of commercial partially pregelatinized starch (PCS (Registered Trademark) produced by Asahi Kasei Chemicals; grade FC-30; moisture content: 5.2% by weight; degree of water retention: 4.3 ml/g). The mixture ratio of the above-described partially pregelatinized starch and the raw royal jelly is given as an absolute dehydrated weight ratio of raw royal jelly to the partially pregelatinized starch of 0.42. This mixture of commercial raw royal jelly and partially pregelatinized starch was placed in a mixer for this experiment (a kneading machine KM-201 for a granule maker, made by TsutsuiRikagaku Kikai Co. Ltd.). The raw royal jelly was inserted first, followed by the partially pregelatinized starch, and mixing was done at room temperature and pressure but without heating for five minutes. The mixture of raw royal jelly and partially pregelatinized starch was then placed in a granulator for the experiment (granule maker KAR-180, made by TsutsuiRikagaku Kikai Co. Ltd.), and the pelletization process was performed for two to three minutes until the mixture dropped from the plus sieve. The royal jelly after the pelletization process was then spread out into a layer and was dehydrated (air dried) at room temperature and pressure for seven days at 25° C. without heating. The moisture content of the thus-obtained pelletized royal jelly was 13.4% by weight and had a predetermined granule size distribution that is easy to ingest. Testing to determine the numbers of bacteria and the presence of heavy metals showed that both were at levels that would cause no problems for foodstuffs. After the thus-obtained pelletized royal jelly was stored for 14 days in a sealed container at room temperature and pressure, the number of ordinary bacteria therein was found to be small, and colonic bacterium colonies therein were negative, at a level that would cause no problems. When it came to tasting the thus-obtained pelletized royal jelly, there was no sour taste in the mouth nor any tingling sensation as the product passed through the throat, there was no characteristic smell, and absolutely no feeling that the product was difficult to ingest.

What is claimed is:

1. A pelletization method for raw royal jelly, the method consisting essentially of the steps of:
providing raw royal jelly;
mixing said raw royal jelly at room temperature and pressure but without heating with a partially pregelatinized starch that remains in the form of starch particles, retains the shell structure of starch grains but has an extremely low water-soluble content, and also has a degree of water retention of 3 to 6 mL/g, at a mixing ratio of 0.1-4.0 of said raw royal jelly to said partially pregelatinized starch, wherein the mixing ratio is an absolute dehydrated weight ratio of the raw royal jelly to the partially pregelatinized starch, thereby creating a royal jelly mixture;
pelletizating said royal jelly mixture at room temperature and pressure but without heating, thereby obtaining an intermediate pelletized royal jelly product from said royal jelly mixture; and
dehydrating said pelletized royal jelly intermediate product at room temperature and pressure, but without heating, to a moisture content of 3 to 15% by weight, thereby obtaining a pelletized royal jelly product having a predetermined granule size distribution that is easy to ingest.

2. A pelletization method for raw royal jelly, the method consisting essentially of the steps of:
providing raw royal jelly;
mixing and pelletization involving mixing said raw royal jelly at room temperature and pressure but without heating with a partially pregelatinized starch that remains in the form of starch particles, retains the shell structure of starch grains but has an extremely low water-soluble content, and also has a degree of water retention of 3 to 6 mL/g, at a mixing ratio of 0.1-4.0 of said raw royal jelly to said partially pregelatinized starch, to create a royal jelly mixture, wherein the mixing ratio is an absolute dehydrated weight ratio of the raw royal jelly to the partially pregelatinized starch; and simultaneously pelletizating said royal jelly mixture at room temperature and pressure but without heating, to create an intermediate pelletized royal jelly product from said royal jelly mixture; and
dehydrating said pelletized royal jelly intermediate product at room temperature and pressure, but without heating, to a moisture content of 3 to 15% by weight, to create a pelletized royal jelly product having a predetermined granule size distribution that is easy to ingest.

3. The pelletization method according to claim 1, wherein said degree of water retention is 3 to 5 mL/g.

4. The pelletization method according to claim 1, wherein said mixing ratio is 0.2 to 0.9.

5. The pelletization method according to claim 1, wherein during said step of mixing or during both said mixing and pelletization steps, raw royal jelly is added first, followed by partially pregelatinized starch.

6. The pelletization method according to claim 2, wherein said degree of water retention is 3 to 5 mL/g.

7. The pelletization method according to claim 2, wherein said mixing ratio is 0.2 to 0.9.

8. The pelletization method according to claim 2, wherein during said step of mixing and pelletization, raw royal jelly is added first, followed by partially pregelatinized starch.

* * * * *